United States Patent Office 3,010,788
Patented Nov. 28, 1961

3,010,788
METHOD OF SEPARATING STRONTIUM FROM OTHER FISSION PRODUCTS
Eugen Glueckauf, Chilton, England, assignor to The United Kingdom Atomic Energy Authority, London, England
No Drawing. Filed Oct. 18, 1957, Ser. No. 690,887
Claims priority, application Great Britain Oct. 26, 1956
2 Claims. (Cl. 23—102)

This invention relates to the separation of strontium from aqueous solutions containing other metal ions.

More particularly it relates to a method of separating radioactive strontium from aqueous solutions comprising the highly radioactive waste products of a nuclear reactor.

An object of the invention is to obtain radioactive strontium free from contamination with other nuclear fission products and free from contamination with aluminium.

The highly radioactive waste solutions from a nuclear reactor often contain aluminium as well as the usual fission products including strontium. It is known to separate the strontium from other fission products by adding cold concentrated nitric acid to the aqueous waste solutions to precipitate it as strontium nitrate, the latter being soluble in 19 molar nitric acid to the extent of only 2.5 milligrams per litre at 25° C. When, however, aluminium is present in the waste solution, e.g. in amounts 30 or more times the amount of strontium, a substantial amount of aluminium nitrate is precipitated also, and this carries down with it other radioactive fission products, which seriously contaminate the strontium nitrate.

It is desirable to obtain the strontium in a radiochemically pure condition for use as a radiation source. It is therefore important to avoid the precipitation of aluminium along with the strontium.

It has now been discovered that, although the solubility of strontium nitrate in concentrated nitric acid increases with temperature (reaching 4.9 milligrams per litre in 19 molar nitric acid at 75° C.), the solubility of aluminium nitrate under the same conditions increases much more rapidly. It is therefore possible to precipitate strontium nitrate substantially free from aluminium nitrate by carrying out the addition of nitric acid and the subsequent precipitation at a higher temperature.

According to the invention, strontium nitrate is separated from an aqueous solution comprising nuclear fission products and also comprising aluminium, by the addition of concentrated nitric acid to the solution in quantity sufficient to cause the precipitation of substantially the whole of the strontium in the solution as strontium nitrate and at a temperature high enough to prevent precipitation of aluminium nitrate, and separating the precipitate from the solution.

Preferably, the addition of nitric acid is such as to raise the concentration of nitric acid in the solution to at least 18 molar, and preferably the temperature of such addition is at least about 50° C. A higher temperature of addition than 50° C. may be necessary, depending on the amount of aluminium present. A temperature of 75° C. will be sufficient in most cases to prevent precipitation of aluminium nitrate. To ensure maximum precipitation of strontium nitrate, it is preferable to maintain the solution at the elevated temperature for at least 12 hours. Separation of the precipitate may be achieved by any suitable means such as filtration, centrifuging, or decanting.

The strontium nitrate separated according to the invention may be in admixture with some barium nitrate which is also precipitated under these conditions, but such barium has negligible radioactivity compared wtih the strontium and being chemically similar to strontium does not adversely affect its properties.

Strontium nitrate produced by this method is substantially free from aluminium and uncontaminated by other fission products.

Radioactive strontium nitrate produced by this method is of great value as a source of radiation for industrial and other uses, and for these purposes is preferably converted to other more stable strontium salts, for example, strontium carbonate or sulphate, by known methods.

The aqueous waste solutions from a nuclear reactor using natural uranium as fuel comprise a variety of fission products, corrosion products, impurities originally present in the uranium, and a small proportion of the uranium itself. Such waste solutions from such reactors may contain the metals given in the following table, in which is given also a typical value of the concentration of each metal in the waste solution after suitable concentration to small bulk and after a suitable ageing period to allow decay of the shorter-lived fission products.

| Metal | Class of product | Concentration (gm./litre) |
|---|---|---|
| Rubidium | Fission product | 0.15 |
| Caesium | do | 1.6 |
| Strontium | do | 0.40 |
| Barium | do | 0.42 |
| Rare earths | do | 2.9 |
| Zirconium | do | 1.2 |
| Ruthenium | do | 0.46 |
| Uranium | Fuel | 50 |
| Aluminium | Fuel impurity | 17 |
| Lead | do | 0.6 |
| Iron | Fuel impurity and/or corrosion product | 16 |
| Nickel | | 3.0 |
| Chromium | | 2.0 |

In the above table, the rare earths include yttrium, lanthanum, cerium, praseodymium, and neodymium. A typical aqueous waste solution may comprise a solution of the nitrates of these metals in nitric acid of, for example, 3 normal concentration.

The nature of the invention and methods by which it may be performed will be more readily understood by reference to the following example, in which a simulated aqueous waste solution from a nuclear reactor is treated to recover strontium therefrom.

*Example*

A solution of metal nitrates was made up having the concentrations given in the above table, but made up with non-radioactive materials, and a small amount of radioactive strontium was added to it as a tracer. The solution was heated to 50° C. and then concentrated (98%) nitric acid was added until the solution was 19 molar in nitric acid. The temperature was maintained at 50° C. for 12 hours, at the end of which period the precipitate was separated by filtration. The precipitate was found to contain 97% of the strontium as measured by radioactive tracer techniques, and substantially no aluminium or any of the other simulated fission products except a small amount of barium. A similar procedure carried out at 25° C. resulted in the separation of a similar proportion of the strontium together with a large amount of aluminium and a substantial proportion of the other simulated fission products.

I claim:

1. The method of separating strontium nitrate from an aqueous fission product solution containing strontium and aluminum as nitrates, said aluminum being present in an amount of at least approximately thirty times the strontium concentration, and resulting from the use of uranium as fuel in a nuclear reactor, comprising adding nitric acid of greater than 18-molar concentration to said solution and in an amount sufficient to obtain a nitric acid concentration of at least 18-molar in the solution and cause precipitation of the strontium nitrate therefrom, while maintaining the solution at a temperature of at least about 50° C. and sufficient to prevent precipitation of the aluminum nitrate, and separating the strontium nitrate precipitate from the solution.

2. The method according to claim 1 wherein nitric acid of 98% concentration is added to the solution in an amount sufficient to obtain a nitric acid concentration of at least 19-molar in the solution.

References Cited in the file of this patent

Lieber, Naturwissenschaften, vol. 27, pp. 421–423 (1939).